United States Patent
Choe

(10) Patent No.: US 9,386,737 B2
(45) Date of Patent: Jul. 12, 2016

(54) BIODEGRADING MULCHING FILM SEED ATTACHMENT AUTOMATING DEVICE HAVING CUTTING OPEN AND ADHESIVE COATING MEANS, AND SEED ATTACHMENT METHOD USING SAID DEVICE

(71) Applicant: GREEN&SEED CORP., Chungcheongbuk-do (KR)

(72) Inventor: Young Hoon Choe, Chungcheongbuk-do (KR)

(73) Assignee: GREEN&SEED CORP., Chungcheongbuk-Do (KR)

( * ) Notice: Subject to any disclaimer, the term of this patent is extended or adjusted under 35 U.S.C. 154(b) by 0 days.

(21) Appl. No.: 14/434,592

(22) PCT Filed: Sep. 6, 2013

(86) PCT No.: PCT/KR2013/008046
§ 371 (c)(1),
(2) Date: Apr. 9, 2015

(87) PCT Pub. No.: WO2014/058156
PCT Pub. Date: Apr. 17, 2014

(65) Prior Publication Data
US 2015/0230395 A1 Aug. 20, 2015

(30) Foreign Application Priority Data

Oct. 10, 2012 (KR) .................. 10-2012-0112249

(51) Int. Cl.
*A01C 1/04* (2006.01)
(52) U.S. Cl.
CPC ............. *A01C 1/04* (2013.01); *A01C 2001/048* (2013.01)
(58) Field of Classification Search
CPC .... A01C 2001/048; A01C 1/04; A01C 1/044; A01C 1/046; A01C 1/042; A01C 1/02; A01C 1/06
See application file for complete search history.

(56) References Cited

FOREIGN PATENT DOCUMENTS

| KR | 10-0936993 B1 | 1/2010 |
| KR | 10-2010-0020876 A | 2/2010 |
| KR | 10-1006144 B1 | 1/2011 |
| KR | 20-2011-0006807 U | 7/2011 |

OTHER PUBLICATIONS

Translated KR 10-1006144; Publication date: Dec. 29, 2010.*
Machine translation of KR-10-1006144.*
International Search Report of International Application No. PCT/KR2013/008046 mailed Nov. 27, 2013.

* cited by examiner

*Primary Examiner* — Jacob T Minskey
*Assistant Examiner* — Vishal I Patel
(74) *Attorney, Agent, or Firm* — K&L Gates LLP

(57) ABSTRACT

The present invention concerns a biodegrading mulching film seed attachment automating device having a cutting open and adhesive coating means, and a seed attachment method using said device. More specifically, the present invention relates to a biodegrading mulching film seed attachment automating device having a cutting open and adhesive coating means, the device comprising: an unwinder which winds the mulching film so as to store same in the form of a roll; a moving means for moving the mulching film, which has been wound on the unwinder, to a working area; a cutting open and adhesive coating means which is provided in the working area, forms a plurality of germination slits of specific length in the mulching film that has been moved to the working area, and, at the same time, coats an adhesive onto the mulching film in which the germination slits have been formed; a seed attachment means which attaches seeds in positions where the adhesive has been coated; a re-winder which winds the mulching film, to which the seeds have been attached, so as to store same in the form of a roll; and a control unit which controls the unwinder, the moving means, the cutting open and adhesive coating means, the seed attachment means and the re-winder.

3 Claims, 10 Drawing Sheets

BIODEGRADING MULCHING FILM SEED ATTACHMENT AUTOMATING DEVICE HAVING CUTTING OPEN AND ADHESIVE COATING MEANS, AND SEED ATTACHMENT METHOD USING SAID DEVICE

CROSS-REFERENCE TO RELATED APPLICATION

This application is the United States National Stage of and claims priority to International Application No. PCT/KR2013/008046, which was filed Sep. 6, 2013, that claims priority to Korean Application No. 10-2012-0112249 filed Oct. 10, 2012, titled "BIODEGRADING MULCHING FILM SEED ATTACHMENT AUTOMATING DEVICE HAVING CUTTING OPEN AND ADHESIVE COATING MEANS, AND SEED ATTACHMENT METHOD USING SAID DEVICE", both of which are incorporated herein by reference in their entirety.

TECHNICAL FIELD

The present invention relates to an automated apparatus for attaching seeds to biodegradable mulching film with a cut-out and adhesive application means and a method for attaching seeds using the device. More particularly, the present invention relates to an automated apparatus for attaching seeds to biodegradable mulching film, which is provided with a cut-out and adhesive application means to form germination gaps before seed attachment and, at the same time, to automatically apply an adhesive to the space between the germination gaps, thus making the process simplified and economic.

BACKGROUND ART

Generally, when seeds are sown using biodegradable eco-friendly mulching film to prevent weeds according to conventional methods, it is difficult to accurately form through holes at regular intervals in the mulching film. Moreover, there is no means to punch holes at regular intervals in the mulching film, apply an adhesive to the mulching film, and attach seeds to the mulching film at the same time, and thus it is difficult to effectively perform these processes.

Moreover, the adhesive application process and the seed attachment process are difficult to proceed smoothly as a series of flows by an automated process, which results in increased production time as well as increased production costs.

FIG. 1 is a diagram schematically showing the configuration of a conventional automated apparatus for attaching seeds to biodegradable mulching film. As shown in FIG. 1, it can be seen that the conventional automated apparatus comprises an unwinder 10, a transfer means 20 having a plurality of rotating units, a punching means 8, an adhesive application means 9, a seed attachment means 50, a drying device 90, a rewinder 70, etc.

Specifically, a biodegradable mulching film 1 being wound on the unwinder 10 is fed at a constant speed to the punching means 8, the punching means 8 forms through holes in the biodegradable mulching film 1, the adhesive application means 9 applies an adhesive to the sites adjacent to where the through holes are formed, the seed attachment means 50 attaches seeds to the sites where the adhesive is applied, and then the resulting film is dried by the drying device 90 and wound again on the rewinder, thereby completing the process.

However, according to in this conventional automated apparatus for attaching seeds to biodegradable mulching film in which the punching means and the adhesive application means are divided into separate components, the punching means and the adhesive application means should be synchronized with each other to apply the adhesive to the sites where the through holes are formed, which is difficult to control and which complicates the process, resulting in a large apparatus, which increases the production costs.

DISCLOSURE

Technical Problem

The present invention has been made in an effort to solve the above-described problems associated with prior art, and an object of the present invention is to provide a seed attachment apparatus and method, in which a cut-out and adhesive application means integrating a cut-out means and an adhesive application means is provided so as to simultaneously perform the cut-out and the adhesive application without the synchronization of the cut-out means and the adhesive application means, thereby simplifying the process and economically performing the seed attachment.

Moreover, the present invention provides a seed attachment apparatus and method, in which instead of existing germination holes (through holes), a plurality of germination gaps are formed by the cut-out and adhesive application means, which makes it possible to prevent damage by birds, prevent weed germination, and more effectively maintain the germination temperature and humidity.

Furthermore, the present invention provides an automated apparatus which is provided with a release agent application means to apply a release agent to the sites, where an adhesive is applied, successively after the adhesive application and the seed attachment, thus eliminating the phenomenon of blocking of the mulching film.

Other objects, specific advantages, and novel features of the present invention will become more apparent from the following detailed description and preferred embodiments when taken in conjunction with the accompanying drawings.

Technical Solution

The object of the present invention can be achieved by an automated apparatus for attaching seeds to biodegradable mulching film with a cut-out and adhesive application means, the automated apparatus comprising: an unwinder which winds the mulching film and stores the mulching film in the form of a roll; a transfer means which transfers the mulching film wound on the unwinder to a working area; the cut-out and adhesive application means which is provided in the working area to form a plurality of germination gaps having a predetermined length in the mulching film transferred to the working area and, at the same time, apply an adhesive to the mulching film where the germination gaps are formed; a seed attachment means which attaches seeds to the sites where the adhesive is applied; a rewinder which winds the mulching film to which the seeds are attached and stores the mulching film in the form of a roll; and a control unit which controls the unwinder, the transfer means, the cut-out and adhesive application means, the seed attachment means, and the rewinder.

The cut-out and adhesive application means may comprise a driving roller; at least one projection gap roller which projects from the outer surface of the driving roller along the longitudinal direction thereof and has a plurality of gaps spaced apart a predetermined interval; a roller driving unit which drives the driving roller; an adhesive roller which is provided on one side of the working area and comes into contact with one side of the projection gap roller to apply an adhesive to the mulching film; at least one cutter which is provided on each of both sides of the adhesive roller and inserted into the gap of the projection gap roller to form the germination gap in the mulching film; and an adhesive nozzle which feeds the adhesive to the surface of the adhesive roller.

The automated apparatus of present invention may further comprise a release agent application means which is provided between the seed attachment means and the rewinder and applies an release agent to the mulching film to which the seeds are attached to remove the adhesive force of the adhesive, wherein the mulching film comprises markers spaced apart from each other a first predetermined interval and attached to the mulching film along the longitudinal direction thereof, wherein a recognition unit provided in the seed attachment means and a detection unit provided in the release agent application means detect the markers and transmit detection signals to the control unit, wherein the control unit controls the transfer speed and tension of the mulching film by controlling the transfer means, wherein the seed attachment means comprises a seed storage unit which stores the seeds therein, a plurality of attachment arms which are spaced apart from each other a second predetermined interval and attach the seeds to the sites where the adhesive is applied, and a first interval adjusting unit which adjusts the interval between the attachment arms, wherein the release agent application means comprises a release agent storage unit which stores the release agent therein, a plurality of release agent nozzles which are spaced apart from each other a second predetermined interval and inject the release agent to the sites where the adhesive is applied, a release agent feeding unit which feeds the release agent from the release agent storage unit to the release agent nozzles, and a second interval adjusting unit which adjusts the interval between the release agent nozzles.

When receiving a detection signal from the recognition unit, the control unit may stop the operation of the transfer means, control the attachment arms to attach the seeds to the sites where the adhesive is applied.

In a different category, the object of the present invention can be achieved by a seed attachment method using the above-mentioned automated apparatus for attaching seeds to biodegradable mulching film with the cut-out and adhesive application means, the method comprising the steps of: winding the mulching film on an unwinder and storing the mulching film in the form of a roll; transferring, at a transfer means, the mulching film wound on the unwinder to a working area; forming, at the cut-out and adhesive application means, a plurality of germination gaps having a predetermined length in the mulching film transferred to the working area and, at the same time, applying an adhesive to the mulching film where the germination gaps are formed; attaching, at a plurality of attachment arms of a seed attachment means, seeds to the sites where the adhesive is applied; applying, at a plurality of release agent nozzles provided in a release agent application means, a release agent to the sites where the adhesive is applied; and winding, at a rewinder, the mulching film to which the seeds are attached and storing the mulching film in the form of a roll.

Advantageous Effects

Therefore, according to the above-described embodiments of the present invention, with the use of the cut-out and adhesive application means integrating a cut-out means and an adhesive application means, it is possible to simultaneously perform the cut-out and the adhesive application without the synchronization of the cut-out means and the adhesive application means, thereby simplifying the process and economically performing the seed attachment.

Moreover, instead of existing germination holes (through holes), with the use of the plurality of germination gaps formed by the cut-out and adhesive application means, it is possible to prevent damage by birds, prevent weed germination, and more effectively maintain the germination temperature and humidity.

Furthermore, it is possible to provide an automated apparatus which is provided with a release agent application means to apply a release agent to the sites, where an adhesive is applied, successively after the adhesive application and the seed attachment, thus eliminating the phenomenon of blocking of the mulching film. In addition, with the use of the release agent made of fertilizers, pesticides, etc., it is possible to eliminate farm works such as supplemental fertilization, pesticide pest control, etc. after laying the mulching film, resulting in reduced labor costs.

Figure 1:
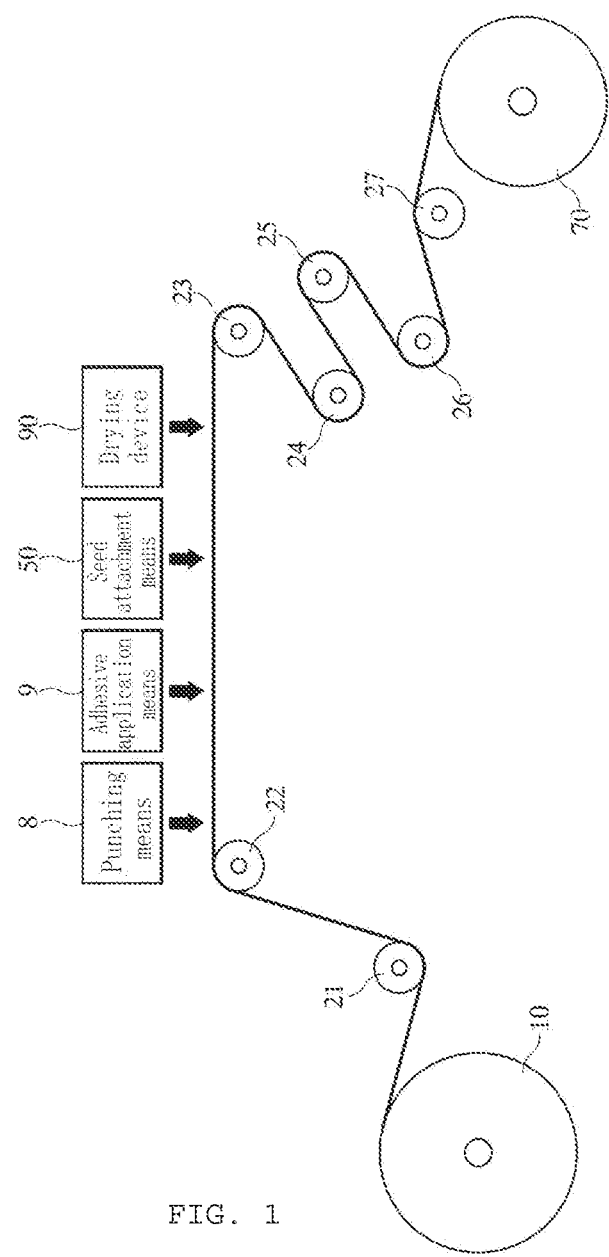
FIG. 1 is a diagram schematically showing the configuration of a conventional automated apparatus for attaching seeds to biodegradable mulching film.

| DESCRIPTION OF REFERENCE NUMERALS | |
|---|---|
| 1: mulching film | 2: seed |
| 3: germination gap | |
| 4: first predetermined interval | |
| 5: second predetermined interval | |
| 6: marker | 7: blocking |
| 8: punching means | |
| 9: adhesive application means | 10: unwinder |
| 20: transfer means | 21: first rotating unit |
| 22: second rotating unit | 23: third rotating unit |
| 24: fourth rotating unit | 25: fifth rotating unit |
| 26: six rotating unit | |
| 27: seventh rotating unit | |
| 40: cut-out and adhesive application means | |
| 41: driving roller | |
| 42: projection gap roller | 43: gap |
| 44: roller driving unit | 45: cutter |
| 46: adhesive roller | 47: adhesive nozzle |
| 50: seed attachment means | 54: attachment arm |
| 52: recognition unit | |
| 53: first interval adjusting unit | |
| 60: release agent application means | |
| 61: release agent nozzle | |
| 62: second interval adjusting unit | |
| 63: detection unit | 70: rewinder |
| 80: control unit | 90: drying device |
| 100: automated apparatus for seed attachment | |

MODE FOR INVENTION

Hereinafter, preferred embodiments of the present invention will be described in detail with reference to the accompanying drawings so that those skilled in the art to which the present invention pertains can easily practice the invention. However, in the detailed description of the preferred embodiments of the invention, when it is considered that detailed descriptions of related well-known functions and constructions may obscure the gist of the present invention, their detailed descriptions will be omitted.

Moreover, throughout the drawings, the same reference numerals are used to denote the same or similar functions and operations. In addition throughout the specification, when it is described that a certain part is "connected to" another part, this means that they are either "directly connected" to each other or "indirectly connected" to each other with another device being interposed therebetween. Also, when it is described that a certain portion includes a certain component, this means that another component is not excluded, but the portion may further include another component, unless otherwise stated specifically.

In the following, the configuration and function of the automated apparatus 100 for seed attachment, which includes a cut-out and adhesive application means 40 configured to attach seeds to a biodegradable mulching film 1 according to an embodiment of the present invention will be described. First, FIG. 2 is a partial front view of a mulching film 1 to which seeds are to be attached by the automated apparatus 100 for seed attachment with the cut-out and adhesive application means 40 according to an embodiment of the present invention.

Figure 2:
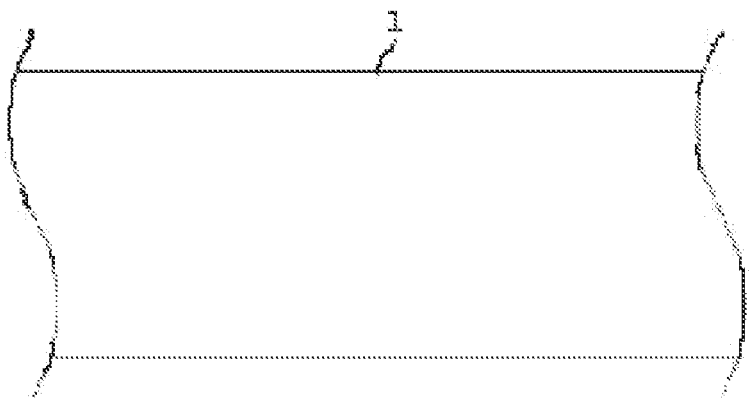
FIG. 2 is a partial front view of a mulching film fed to an automated apparatus for seed attachment with a cut-out and adhesive application means according to an embodiment of the present invention.

As shown in FIG. 2, it can be seen that a plurality of germination gaps are not formed in the biodegradable mulching film 1 which is to be fed to the automated apparatus 100 for seed attachment with the cut-out and adhesive application means 40 according to an embodiment of the present invention.

Figure 3:
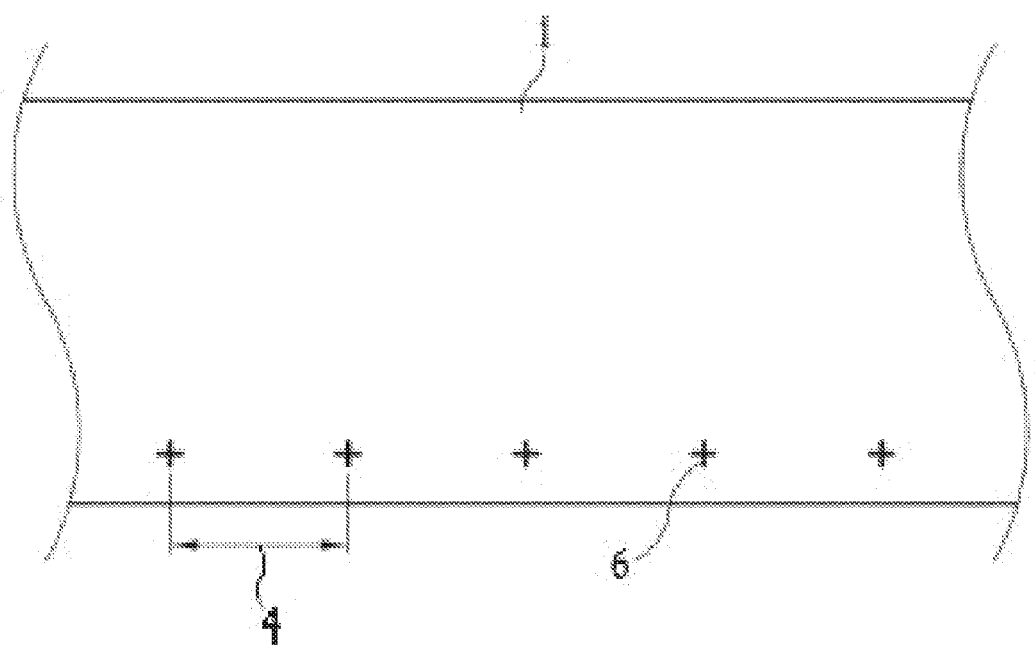
FIG. 3 is a partial front view of a mulching film, to which markers are attached, fed to an automated apparatus for seed attachment with a cut-out and adhesive application means according to an embodiment of the present invention.

Moreover, FIG. 3 is a partial front view of a mulching film 1 with markers 6 to which seeds are to be attached by the automated apparatus 100 for seed attachment with the cut-out and adhesive application means 40 according to an embodiment of the present invention. As shown in FIG. 3, it can be seen that the markers 6 are attached to the biodegradable mulching film 1 which is to be fed to the automated apparatus 100 for seed attachment with the cut-out and adhesive application means 40 according to an embodiment of the present invention. As shown in FIG. 3, it can be seen that the markers 6 are attached to the lower end of the mulching film 1, spaced apart from each other a first predetermined interval 4 along the longitudinal direction of the mulching film 1. As will be described later, with the use of the markers 6 attached to the mulching film 1, a seed attachment means 50 and a release agent application means 60, which are provided in the automated apparatus 100 for seed attachment with the cut-out and adhesive application means 40 according to an embodiment of the present invention, can recognize the markers 6, accurately attach the seeds, and apply a release agent.

Figure 4:
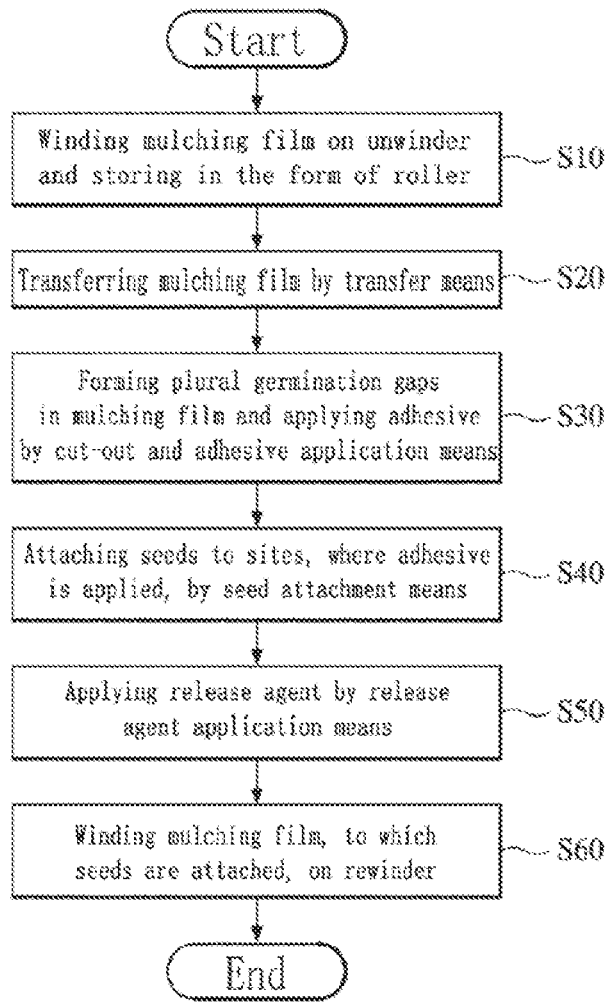
FIG. 4 is a flowchart of a seed attachment method using an automated apparatus for seed attachment with a cut-out and adhesive application means according to an embodiment of the present invention.
Figure 5:
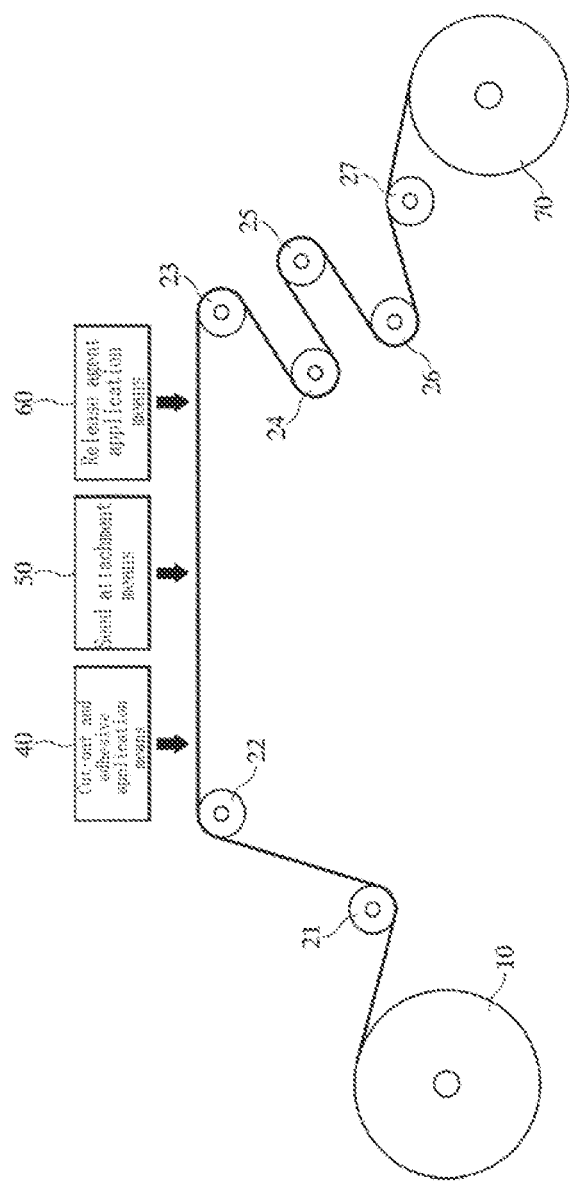
FIG. 5 is a diagram schematically showing the configuration of an automated apparatus for seed attachment with a cut-out and adhesive application means according to an embodiment of the present invention.

FIG. 4 is a flowchart of a seed attachment method using an automated apparatus 100 for seed attachment with the cut-out and adhesive application means 40 according to an embodiment of the present invention. FIG. 5 is a cross-sectional view schematically showing an automated apparatus 100 for seed attachment with a cut-out and adhesive application means 40 according to an embodiment of the present invention.

As shown in FIGS. 4 and 5, the automated apparatus 100 for seed attachment with the cut-out and adhesive application means 40 according to an embodiment of the present invention is an automated apparatus for attaching seeds to the above-mention mulching film 1, which comprises an unwinder 10 which winds the mulching film 1 and stores the same in the form of a roll, a transfer means 20 which transfers the mulching film 1 wound on the unwinder 10 to a working area, a cut-out and adhesive application means 40 which forms a plurality of germination gaps 3 in the mulching film 1 transferred to the working area and, at the same time, applies an adhesive thereto, a seed attachment means 50 which is provided with a recognition unit 52 for recognizing the markers 6 and attaches seeds to the sites where the adhesive is applied by the cut-out and adhesive application means 40, a release agent application means 60 which is provided with a detection unit 63 for detecting the markers 6 and applies a release agent to the mulching film 1 where the adhesive is applied, and a rewinder 70 which winds the mulching film 1 to which the seeds are attached and stores the same in the form of a roll.

Moreover, the automated apparatus 100 for seed attachment with the cut-out and adhesive application means 40 according to an embodiment of the present invention comprises a control unit 80 which controls the transfer speed and tension of the mulching film 1 by controlling the unwinder 10, the transfer means 20, and the rewinder 70. As will be described later, the control unit 80 controls a roller driving unit 44 provided in the cut-out and adhesive application means 40 to accurately form the germination gaps 3 and, at the same time, to apply the adhesive, controls the seed attachment means 50 to attach the seeds to desired sites, and controls the release agent application means 60 to apply the release agent to desired sites.

According to the seed attachment method using the above-described automated apparatus 100 for seed attachment with the cut-out and adhesive application means 40 according to an embodiment of the present invention, the above-mentioned biodegradable mulching film 1 is wound on the unwinder 10 and stored in the form of a roll (S10).

The control unit 80 controls and drives the transfer means 20 to transfer the mulching film 1 wound on the unwinder 10 to the working area (S20). As shown in FIG. 5, it can be seen that the transfer means 20 according to a specific embodiment of the present invention comprises a first rotating unit 21, a second rotating unit 22, a third rotating unit 23, a fourth rotating unit 24, a fifth rotating unit 25, a sixth rotating unit 26, and a seventh rotating unit 27.

Therefore, the control unit 80 controls the transfer speed and tension of the mulching film 1 by controlling the driving speed of each of the first rotating unit 21, the second rotating unit 22, the third rotating unit 23, the fourth rotating unit 24, the fifth rotating unit 25, the sixth rotating unit 26, and the seventh rotating unit 27.

Figure 6:
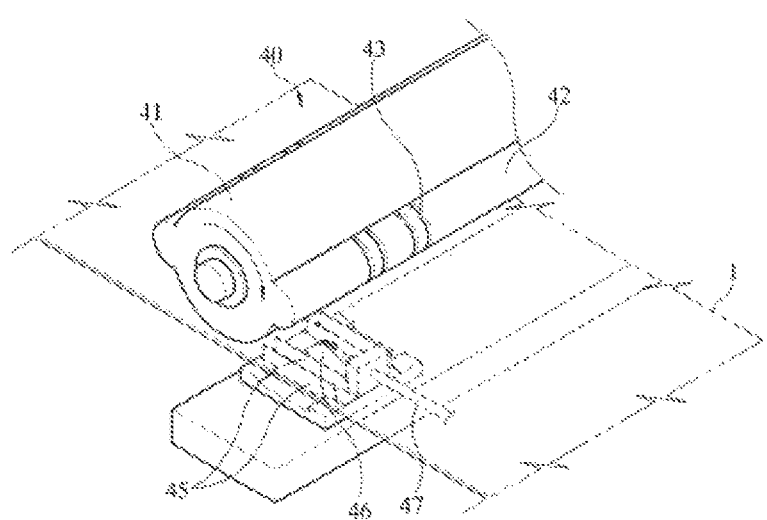
FIG. 6 is a perspective view of a cut-out and adhesive application means according to an embodiment of the present invention.
Figure 7:
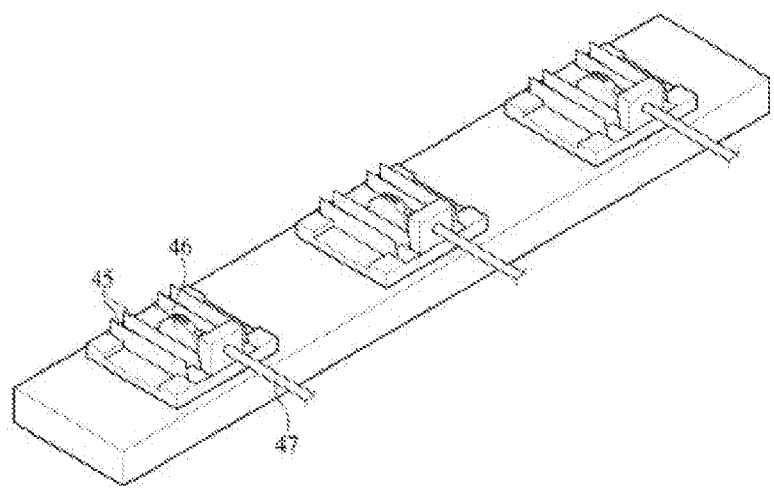
FIG. 7 is a perspective view showing the combination of an adhesive roller, a cutter, and an adhesive nozzle according to an embodiment of the present invention.

Then, a plurality of germination gaps 3 are formed by the cut-out and adhesive application means 40 in the mulching film 1 transferred to the working area and, at the same time, an adhesive is applied thereto (S30). FIG. 6 is a perspective view of a cut-out and adhesive application means 40 according to an embodiment of the present invention, and FIG. 7 is a perspective view showing the combination of an adhesive roller 46, a cutter 45, and an adhesive nozzle 47 according to an embodiment of the present invention.

Figure 8:
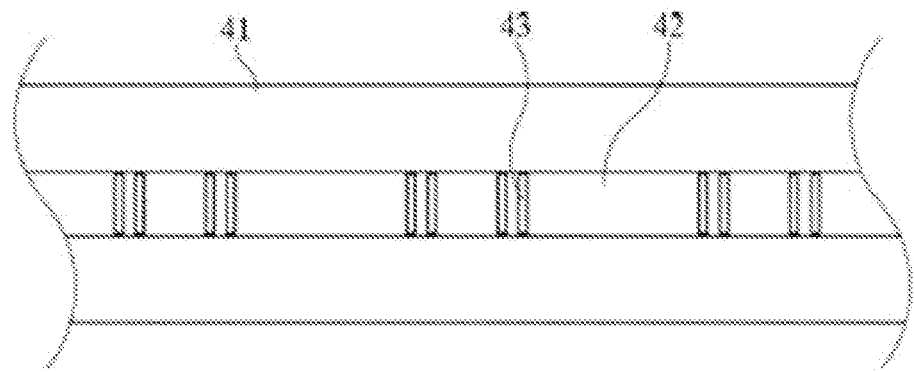
FIG. 8 is a plan view of a driving roller to which projection gap rollers are attached according to an embodiment of the present invention.
Figure 9:
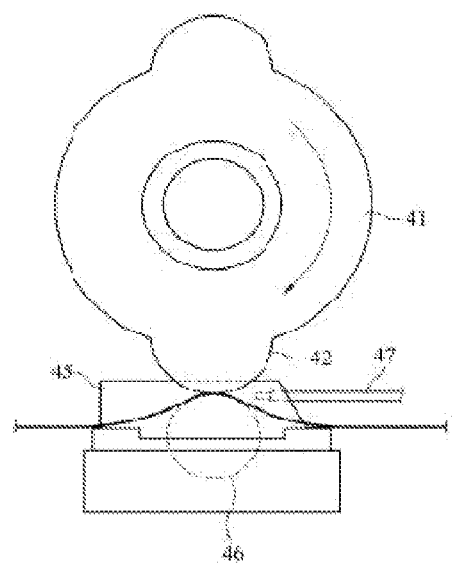
FIG. 9 is a side view of a cut-out and adhesive application means according to an embodiment of the present invention.

Moreover, FIG. 8 is a plan view of a driving roller 41 to which projection gap rollers 42 are attached according to an embodiment of the present invention, and FIG. 9 is a side view of a cut-out and adhesive application means 40 according to an embodiment of the present invention.

Figure 10:
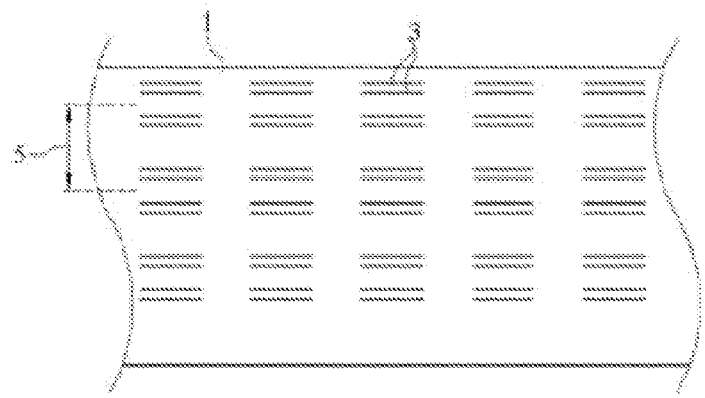
FIG. 10 is a partial front view of a mulching film in which a plurality of germination gaps are formed according to an embodiment of the present invention.
Figure 11:
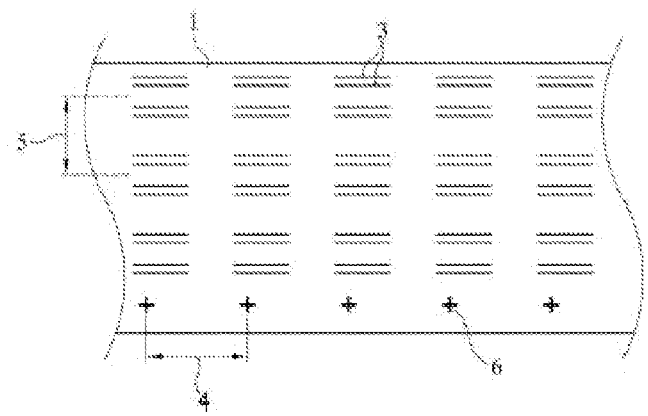
FIG. 11 is a partial front view of a mulching film in which a plurality of germination gaps are formed and to which markers are attached according to an embodiment of the present invention.

Further, FIG. 10 is a partial front view of a mulching film 1 in which a plurality of germination gaps 3 are formed according to an embodiment of the present invention, and FIG. 11 is a partial front view of a mulching film 1 in which a plurality of germination gaps 3 are formed and to which markers 6 are attached according to an embodiment of the present invention.

As shown in FIGS. 6 to 9, it can be seen that the cut-out and adhesive application means 40 according to an embodiment of the present invention comprises a driving roller 41, at least one projection gap roller 42 which projects from the outer surface of the driving roller 41 along the longitudinal direction thereof and has a plurality of gaps 43 spaced apart a predetermined interval, a roller driving unit 44 which drives the driving roller 41, an adhesive roller 46 which is provided on one side of the working area and comes into contact with one side of the projection gap roller 42 to apply an adhesive to the mulching film, at least one cutter 45 which is provided on each of both sides of the adhesive roller 46 and inserted into the gap 42 of the projection gap roller 42 to form the germination gap 3 in the mulching film, and an adhesive nozzle 47 which feeds the adhesive to the surface of the adhesive roller 46.

The driving roller 41 is rotated by the roller driving unit 44 controlled by the control unit, and as shown in FIG. 6, FIG. 8, and FIG. 9, it can be seen that two projection gap rollers 42 spaced apart a predetermined interval are attached to the outer surface of the driving roller 41. The projection gap rollers 42 form a plurality of gaps 43 spaced apart a predetermined interval. Therefore, when the driving roller 41 rotates, the cutter 45 is inserted into the gaps 43 formed by the projection gap rollers 42, and thus the germination gaps 3 are automatically formed in the mulching film.

That is, when the projection gap rollers 42 are moved by the rotation of the driving roller 41, one outer surface of the projection gap rollers 42 is brought into contact with the outer surface of the adhesive roller 46 and, at the same time, the cutter 45 is inserted into the gaps 43 formed by the projection gap rollers 42, thereby forming the germination gaps 3.

At the same time, as shown in FIG. 6, FIG. 7, and FIG. 9, it can be seen that the adhesive nozzle 47 is configured to constantly or periodically inject the adhesive to the outer surface of the adhesive roller 46. As a result, when the mulching film comes into contact with the adhesive roller 46 and the projection gap rollers 42 therebetween, the germination gaps 3 are formed and, at the same time, the adhesive is applied to the space between the germination gaps 3.

Therefore, as the germination gaps 3 can be formed and, at the same time, the adhesive can be applied by the cut-out and adhesive application means 40 according to an embodiment of the present invention, it is possible to simplify the process and it is not necessary synchronize a cut-out means and an adhesive application means provided in the conventional apparatus.

Moreover, the recognition unit 52 provided in the seed attachment means 50 recognizes the markers 6 of the mulching film 1 where the adhesive is applied, and the attachment means 50 attaches seeds to the sites where the adhesive is applied (S40). That is, the recognition unit 52 recognizes the markers 6 attached to the mulching film 1 where the adhesive is applied and transmits a detection signal to the control unit 80, and the control unit 80 receiving the detection signal stops the operation of the transfer means 20 and drives the seed attachment means 50 to attach seeds to the mulching film 1 where the adhesive is applied.

Then, the detection unit 63 of the release agent application means 60 detects the markers 6 attached to the mulching film 1 and applies a release agent to the mulching film 1 where the adhesive is applied (S50). That is, the detection unit 63 detects the markers 6 attached to the mulching film 1 and transmits a detection signal to the control unit 80, and the control unit 80 receiving the detection signal stops the op and drives the release agent application means 60 to apply the release agent to the mulching film 1 where the adhesive is applied. As the release agent, any substances that have release properties, such as fertilizers, pesticides, fibers, minerals, etc. in the form of liquid of powder, can be used without particular limitations, and its specific components should in no way affect the scope of the present invention.

Therefore, due to the release agent application process, it is possible to prevent the mulching films from being adhering to each other (blocking phenomenon) when the mulching films are wound on the rewinder without being dried.

Figure 12:
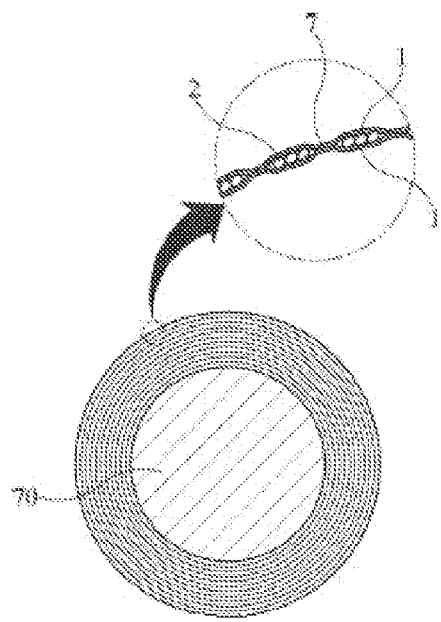
FIG. 12 is a cross-sectional view of a rewinder on which a conventional mulching film without a release agent is wound.
Figure 13:
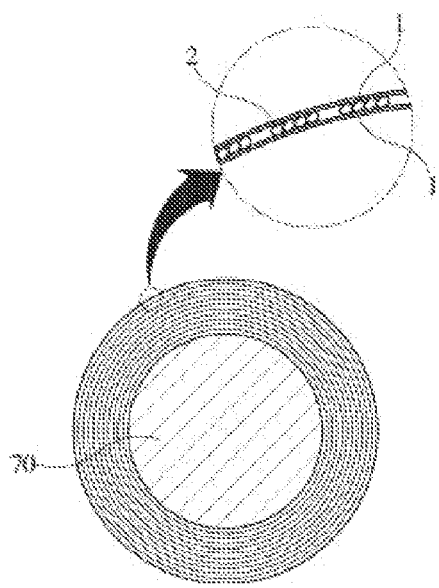
FIG. 13 is a cross-sectional view of a rewinder on which a mulching film with a release agent is wound according to an embodiment of the present invention.

FIG. 12 is a cross-sectional view of a rewinder on which a conventional mulching film without a release agent is wound, and FIG. 13 is a cross-sectional view of a rewinder on which a mulching film with a release agent is wound according to an embodiment of the present invention. As shown in FIG. 12, it can be seen that when no release agent is applied to the mulching film 1, the mulching films wound on the rewinder 70 are adhered to each other by the adhesive remaining in the mulching films. However, as shown in FIG. 13, it can be seen that the blocking phenomenon does not occur when the release agent is applied by the release agent application means 60 according to an embodiment of the present invention after the seed attachment. Lastly, the mulching film 1, to which seeds are attached, is wound on the rewinder 70 and stored in the form of a roller (S60).

Figure 14:
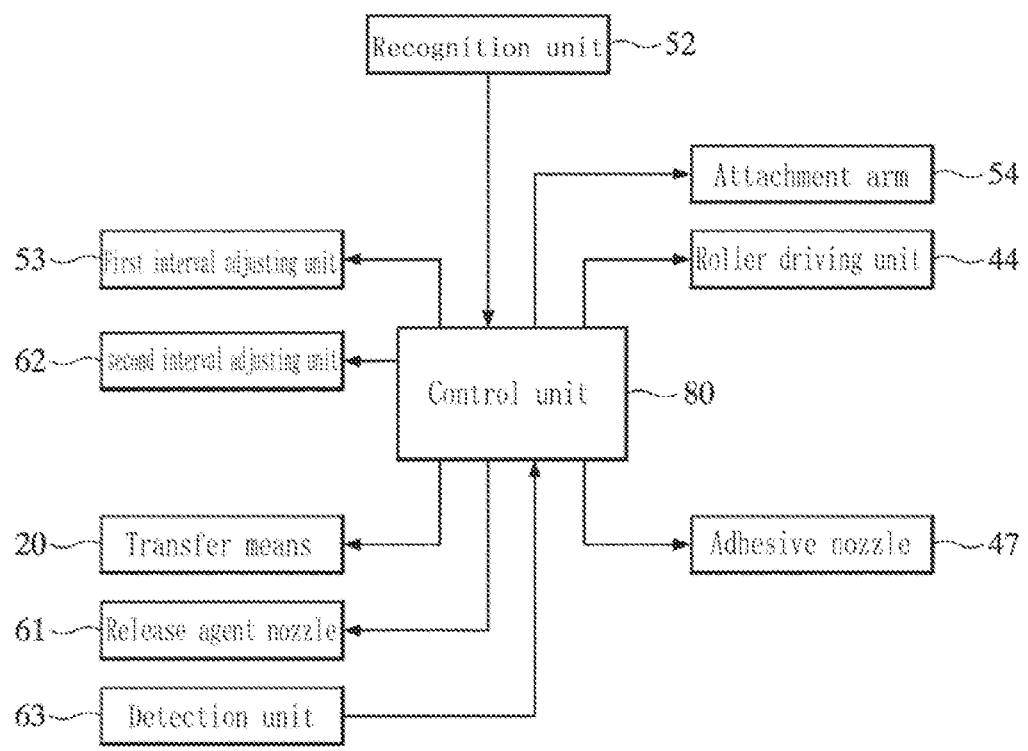
FIG. 14 is a block diagram of an automated apparatus for seed attachment with a cut-out and adhesive application means, which shows the flow of signals by a control unit according to an embodiment of the present invention.

Moreover, FIG. 14 is a block diagram of an automated apparatus for seed attachment with a cut-out and adhesive application means 40, which shows the flow of signals by a control unit according to an embodiment of the present invention. It can be seen that the automated apparatus 100 for seed attachment provided with the cut-out and adhesive application means 40 according to an embodiment of the present invention comprises an unwinder rotating unit for rotating the unwinder 10 on which the biodegradable mulching film 1 with the marker 6 is wound and stored in the form of a roller, a first rotating unit 21, a second rotating unit 22, a third rotating unit 23, a fourth rotating unit 24, a fifth rotating unit 25, a sixth rotating unit 26, and a rewinder rotating unit for rotating the rewinder 70.

The control unit 80 drives the unwinder rotating unit, the first rotating unit 21, the second rotating unit 22, the third rotating unit 23, the fourth rotating unit 24, the fifth rotating unit 25, the sixth rotating unit 26, and the rewinder rotating unit to open and transfer the mulching film 1. Moreover, the control unit 80 controls the transfer speed and tension of the mulching film 1 by controlling the unwinder rotating unit, the first rotating unit 21, the second rotating unit 22, the third rotating unit 23, the fourth rotating unit 24, the fifth rotating unit 25, the sixth rotating unit 26, and the rewinder rotating unit.

The mulching film 1 is transferred to a working area by the operation of the first rotating unit 21 and transferred to the cut-out and adhesive application means 40 by the second rotating unit 22. The control unit can control the rotation speed of the driving roller 41 by controlling the roller driving unit 44 which is a component of the cut-out and adhesive application means 40. Moreover, the control unit can control the amount of the adhesive injected to the adhesive roller and the injection cycle by controlling the adhesive nozzle 47.

The mulching film 1 where the germination gaps 3 are formed and the adhesive is applied by the cut-out and adhesive application means 40 is transferred to the seed attachment means 50. The seed attachment means 50 may comprise the recognition unit 52 which recognizes the markers 6 attached to the mulching film 1, a seed storage unit which stores the seeds therein, a plurality of attachment arms 54 which attach the seeds to the mulching film 1, and a seed feeding unit which feeds the seeds to the attachment arms 54.

Moreover, the seed attachment means 50 may be provided with a first interval adjusting unit 53 to adjust the interval between the attachment arms 54 such that the interval between the attachment arms 54 is equal to a second predetermined interval 5 of the mulching film 1.

Furthermore, the control unit 80 can control the amount of the seeds fed to the attachment arms 54 by controlling the seed feeding unit. When the recognition unit 52 recognizes the markers 6 while the mulching film 1 is transferred by the operation of the transfer means 20, the control unit 80, which receives a detection signal from the recognition unit 52, stops the operation of the transfer means 20, controls the seed feeding unit to feed the seeds to the attachment arms 54, and controls the attachment arms 54 to accurately and quickly attach the seeds. Upon completion of the seed attachment, the control unit 80 stops the operation of the attachment arms 54 and drives the transfer means 20 again to transfer the mulching film 1 until the recognition unit 52 recognizes the markers 6 attached to the next row.

Then, the mulching film 1 to which the seeds are attached is transferred to the release agent application means 60. The release agent application means 60 comprises a detection unit 63 which detects the markers 6 attached to the mulching film 1 and transmits a detection signal to the control unit 80, a release agent storage unit which stores the release agent therein, a plurality of release agent nozzles 61 which are spaced apart from each other a second predetermined interval 5 and inject the release agent stored in the release agent storage unit to the mulching film 1, and a release agent feeding unit which is provided between the release agent nozzles 61 and the release agent storage unit and controls the amolease agent nozzles 61.

Moreover, the release agent application means 60 may be provided with a second interval adjusting unit 62 to adjust the interval between the release agent nozzles 61 such that the interval between the release agent nozzles 61 is equal to a second predetermined interval 5 of the mulching film 1.

Furthermore, the control unit 80 can control the amount of the release agent fed to the release agent nozzles 61 by controlling the release agent feeding unit. When the detection unit 63 recognizes the markers 6 while the mulching film 1 is transferred by the operation of the transfer means 20, the control unit 80, which receives a detection signal from the detection unit 63, stops the operation of the transfer means 20, controls the release agent feeding unit to feed the release agent to the release agent nozzles 61, and controls the release agent nozzles 61 to accurately and quickly apply the release agent to the site where the adhesive is applied. Upon completion of the release agent application, the control unit 80 stops the operation of the release agent nozzles 61 and drives the transfer means 20 again to transfer the mulching film 1 until the detection unit 63 detects the markers 6 attached to the next row.

Lastly, the mulching film 1 to which the seeds are attached is passed through the fourth rotating unit 24, the fifth rotating unit 25, the sixth rotating unit 26, and the seventh rotating unit 27 and then wound on the rewinder 70 and stored again in the form of a roller.

The following Table 1 shows the comparison of working hours in rice farming between an agricultural method using the mulching film 1 to which the seeds are attached by the automated apparatus 100 for seed attachment with the cut-out and adhesive application means 40 according to an embodiment of the present invention and conventional agricultural methods:

TABLE 1

| Agricultural works | Machine transplanting of middle-aged seeds | Direct seeding on dry paddy field | Seed film agricultural method |
| --- | --- | --- | --- |
| Plowing and harrowing | 2.4 | 1.6 | 4.0 |
| Raising of seedling (seeds) | 6.9 | 0.3 | |
| Direct planting | | 0.7 | 0.1 |
| Transplanting | 3.3 | | |
| Supplemental planting | 1.8 | 1.7 | |
| Basal fertilization | 1 | 0.7 | 0.5 |
| Supplemental fertilization | 0.9 | 0.9 | |
| Herbicide application | 0.7 | 1 | |
| Farmer weeding | 2.7 | 4.2 | |
| Pest control | 2.5 | 2.4 | 2.5 |
| Water management | 3.9 | 3.9 | |
| Harvest | 1.8 | 1.7 | 1.8 |
| Dry | 2.1 | 2.2 | 2.1 |
| Transport and others | 0.7 | 0.6 | 0.7 |
| Total working hours | 30.7 | 21.9 | 11.6 |

As shown in FIG. 1, when the automated apparatus 100 for seed attachment with the cut-out and adhesive application means 40 according to an embodiment of the present invention is applied to rice farming, it can be seen that it is possible to achieve significantly reduced labor costs due to the elimination of the supplemental fertilization, and the weeding work even without the raising of seedling, compared to the conventional agricultural methods.

The invention has been described in detail with reference to the above-mentioned preferred embodiments thereof. However, it will be appreciated by those skilled in the art that changes may be made in these embodiments without departing from the principles and spirit of the invention, the scope of which is defined in the appended claims and their equivalents.

The invention claimed is:

1. An automated apparatus for attaching seeds to biodegradable mulching film with a cut-out and adhesive application means, the automated apparatus comprising:
   an unwinder which winds the mulching film and stores the mulching film in the form of a roll;
   a transfer means which transfers the mulching film wound on the unwinder to a working area;
   the cut-out and adhesive application means which is provided in the working area to form a plurality of germination gaps having a predetermined length in the mulching film transferred to the working area and, at the same time, apply an adhesive to the mulching film where the germination gaps are formed;
   a seed attachment means which attaches seeds to the sites where the adhesive is applied;
   a rewinder which winds the mulching film to which the seeds are attached and stores the mulching film in the form of a roll; and
   a control unit which controls the unwinder, the transfer means, the cut-out and adhesive application means, the seed attachment means, and the rewinder;
   wherein the cut-out and adhesive application means comprises a driving roller;
   at least one projection gap roller which projects from the outer surface of the driving roller along the longitudinal direction thereof and has a plurality of gaps spaced apart a predetermined interval;
   a roller driving unit which drives the driving roller;
   an adhesive roller which is provided on one side of the working area and comes into contact with one side of the projection gap roller to apply an adhesive to the mulching film;
   at least one cutter which is provided on each of both sides of the adhesive roller and inserted into the gap of the projection gap roller to form the germination gap in the mulching film; and
   an adhesive nozzle which feeds the adhesive to the surface of the adhesive roller.

2. The automated apparatus of claim 1, further comprising a release agent application means which is provided between the seed attachment means and the rewinder and applies a release agent to the mulching film to which the seeds are attached to remove the adhesive force of the adhesive;
   wherein the mulching film comprises markers spaced apart from each other a first predetermined interval and attached to the mulching film along the longitudinal direction thereof;
   wherein a recognition unit provided in the seed attachment means and a detection unit provided in the release agent application means detect the markers and transmit detection signals to the control unit;
   wherein the control unit controls the transfer speed and tension of the mulching film by controlling the transfer means;
   wherein the seed attachment means comprises:
      a seed storage unit which stores the seeds therein,
      a plurality of attachment arms which are spaced apart from each other a second predetermined interval and are configured to attach the seeds to the sites where the adhesive is applied, and
      a first interval adjusting unit which adjusts the interval between the attachment arms,
   wherein the release agent application means comprises:
      a release agent storage unit which stores the release agent therein,
      a plurality of release agent nozzles which are spaced apart from each other a second predetermined interval and inject the release agent to the sites where the adhesive is applied,
      a release agent feeding unit which feeds the release agent from the release agent storage unit to the release agent nozzles, and
      a second interval adjusting unit which adjusts the interval between the release agent nozzles.

3. The automated apparatus of claim 2, wherein when receiving a detection signal from the recognition unit, the control unit stops the operation of the transfer means, and controls the attachment arms to attach the seeds to the sites where the adhesive is applied.

* * * * *